(12) United States Patent
LeBlanc

(10) Patent No.: US 7,570,366 B2
(45) Date of Patent: Aug. 4, 2009

(54) APPARATUS FOR MEASURING DEFECTS IN A GLASS SHEET

(75) Inventor: Philip Robert LeBlanc, Corning, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 11/708,846

(22) Filed: Feb. 21, 2007

(65) Prior Publication Data

US 2008/0198366 A1 Aug. 21, 2008

(51) Int. Cl.
*G01B 11/02* (2006.01)

(52) U.S. Cl. ........................ 356/497; 356/513

(58) Field of Classification Search ........... 356/497, 356/511–514, 479, 516
See application file for complete search history.

(56) References Cited

U.S. PATENT DOCUMENTS

| | | | | |
|---|---|---|---|---|
| 5,260,761 | A | 11/1993 | Barker | 356/4.5 |
| 5,600,440 | A | 2/1997 | Bendall | 356/345 |
| 5,706,085 | A | 1/1998 | Blossey et al. | 356/357 |
| 6,377,349 | B1 * | 4/2002 | Fercher | 356/497 |
| 6,493,094 | B2 | 12/2002 | Prikryl et al. | 356/521 |
| 6,631,226 | B1 | 10/2003 | Schoeppe et al. | 385/33 |
| 6,741,359 | B2 * | 5/2004 | Wei et al. | 356/512 |
| 6,788,421 | B2 * | 9/2004 | Fercher et al. | 356/497 |
| 6,922,250 | B2 * | 7/2005 | Fercher | 356/497 |
| 6,924,898 | B2 | 8/2005 | Deck | 356/512 |
| 7,057,737 | B2 | 6/2006 | Millerd et al. | 356/495 |
| 7,145,661 | B2 * | 12/2006 | Hitzenberger | 356/497 |
| 2002/0180869 | A1 | 12/2002 | Callison et al. | 348/203 |
| 2004/0181362 | A1 | 9/2004 | Brose et al. | 702/167 |
| 2005/0046863 | A1 | 3/2005 | Millerd et al. | 356/495 |
| 2005/0046865 | A1 | 3/2005 | Brock et al. | 356/495 |

FOREIGN PATENT DOCUMENTS

| | | |
|---|---|---|
| JP | 10-221009 | 8/1998 |
| JP | 2000-121317 | 4/2000 |
| WO | 2005/052502 | 6/2005 |

* cited by examiner

*Primary Examiner*—Michael A Lyons
(74) *Attorney, Agent, or Firm*—Kevin M. Able

(57) ABSTRACT

A method of measuring the topography of a large, thin, non-flat specular substrate in a production environment with minimal movement of a majority of the measurement apparatus. A gimbal-mounted reflecting element is used to steer a short coherence length probe beam such that the probe beam is substantially perpendicular to a local surface of the substrate. The probe beam and the reference beam are combined and the resulting interference pattern used to characterize defects on the local surface.

9 Claims, 2 Drawing Sheets

APPARATUS FOR MEASURING DEFECTS IN A GLASS SHEET

BACKGROUND OF THE INVENTION

1. Field of the Invention

The present invention is directed to a method of measuring defects in a glass article, and in particular, measuring the topography of thin glass sheets.

2. Technical Background

Flat panel displays, such as liquid crystal displays, are fast overtaking traditional cathode ray tube (CRT) display technology in the commercial arena. The manufacture of LCD display devices relies on thin sheets of pristine-surfaced glass, between which a liquid crystal material is sandwiched. Tolerances for surface defects for these glass sheets is extraordinarily stringent, requiring the ability to measure defects on a nanometer scale. Exacerbating the problem is the fact that the glass sheets are exceptionally thin, typically less than about 0.7 mm, and can be quite large—several square meters or more in some instances. As such large, thin sheets are quite flexible, maintaining the sheet flat, let alone stable (remaining in a given shape over a period of time), can be challenging.

Much effort has gone into developing appropriate fixturing, and measurement techniques that can measure defects quickly, thus reducing dependence on stability-related concerns (movement of the sheet over time). The measurement devices utilized for making nanometer-scale measurements of substrates typically include the use of an interferometer. Interferometers, such as the well-known Michelson interferometer, use interference between beams of light to create an interference pattern indicative of the difference in optical path length between the beams. This difference in path length can be used as an indicator of the topography of a surface under measurement.

One drawback of conventional area-scan techniques for the characterization of nanometer-scale surface defects on a specular surface is the need to maintain the measurement surface perpendicular to the probe or measurement beam while keeping within the angular tolerance of the interferometer. For this reason, the sample under test may be mounted on a movable stage which may be adjusted prior to performing the measurement. While this approach is applicable in a laboratory environment, or where small sample sizes are being measured (e.g. semiconductor wafers), in a production environment for processing large sheets of very thin glass, moving the sheet becomes prohibitive: movement of the sheet can itself create distortion of the sheet surface. Moreover, alignment of the sheet may potentially require repeated movement of the sheet to investigate potential defects over the surface. Movement of a large sheet can require complex, bulky equipment, and increase measurement time. Similar concerns accompany movement of the interferometer.

What is needed is a method and/or apparatus suitable for a production environment that enables nanometer-scale measurements of the surface topography of thin glass sheets, which may not be flat, without needless movement of the sheet or bulky measurement equipment.

SUMMARY

In an embodiment of the present invention a method of characterizing a substrate is disclosed comprising providing a coherent radiation beam, providing a specular, non-flat substrate, splitting the radiation beam into a probe beam and a reference beam, intercepting the probe beam with a first reflective element to irradiate a local surface of the substrate comprising a surface defect wherein the local surface is nominally tilted relative to a longitudinal axis of the probe beam, intercepting and reflecting the reference beam with a second reflective element, collecting the probe beam reflected from the local surface and the reference beam reflected from the second reflective element, combining the reference beam reflected from the second reflective element and the probe beam reflected from the local surface to produce a first set of interference fringes resulting from the local surface tilt and a second set of interference fringes resulting from the surface defect, detecting the first and second sets of interference fringes, steering the probe beam with the first reflective element to minimize the number of interference fringes resulting from the local surface tilt, and using the detected interference fringes resulting from the surface defect to characterize the defect.

In another embodiment, a method of characterizing a substrate is described comprising providing a radiation beam comprising a coherence length less than about 300 µm, splitting the radiation beam into a probe beam and a reference beam, intercepting the probe beam with a first reflective element, steering the probe beam with the reflective element to irradiate a specular local surface of a non-flat substrate such that the probe beam is perpendicular to and reflected from the local surface, intercepting and reflecting with the first reflector the probe beam reflected from the local surface, intercepting and reflecting the reference beam with a second reflective element such that a nominal optical path length of the probe beam and the reference beam are substantially equal, collecting the probe beam reflected from the first reflective element and the reference beam reflected from the second reflective element, combining the reflected reference beam and the probe beam reflected from the first reflective element to produce an interference pattern, detecting the interference pattern across a two-dimensional array of pixels, and using the detected interference pattern to determine a topography of the local surface.

In still another embodiment, a method of characterizing a defect on a substrate surface is disclosed comprising providing a coherent radiation beam, providing a specular, non-flat substrate, splitting the radiation beam into a probe beam and a reference beam, intercepting the probe beam with a first reflective element to irradiate a local surface of the substrate comprising a surface defect wherein the local surface is nominally tilted relative to a longitudinal axis of the probe beam, intercepting and reflecting the reference beam with a second reflective element, collecting the probe beam reflected from the local surface and the reference beam reflected from the second reflective element, combining the reference beam reflected from the second reflective element and the probe beam reflected from the local surface to produce a first set of interference fringes resulting from the local surface tilt and a second set of interference fringes resulting from the surface defect, detecting the first and second sets of interference fringes, steering the reference beam with the second reflective element to minimize the number of interference fringes resulting from the local surface tilt, and using the detected interference fringes resulting from the surface defect to characterize the defect.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

Figure 1:
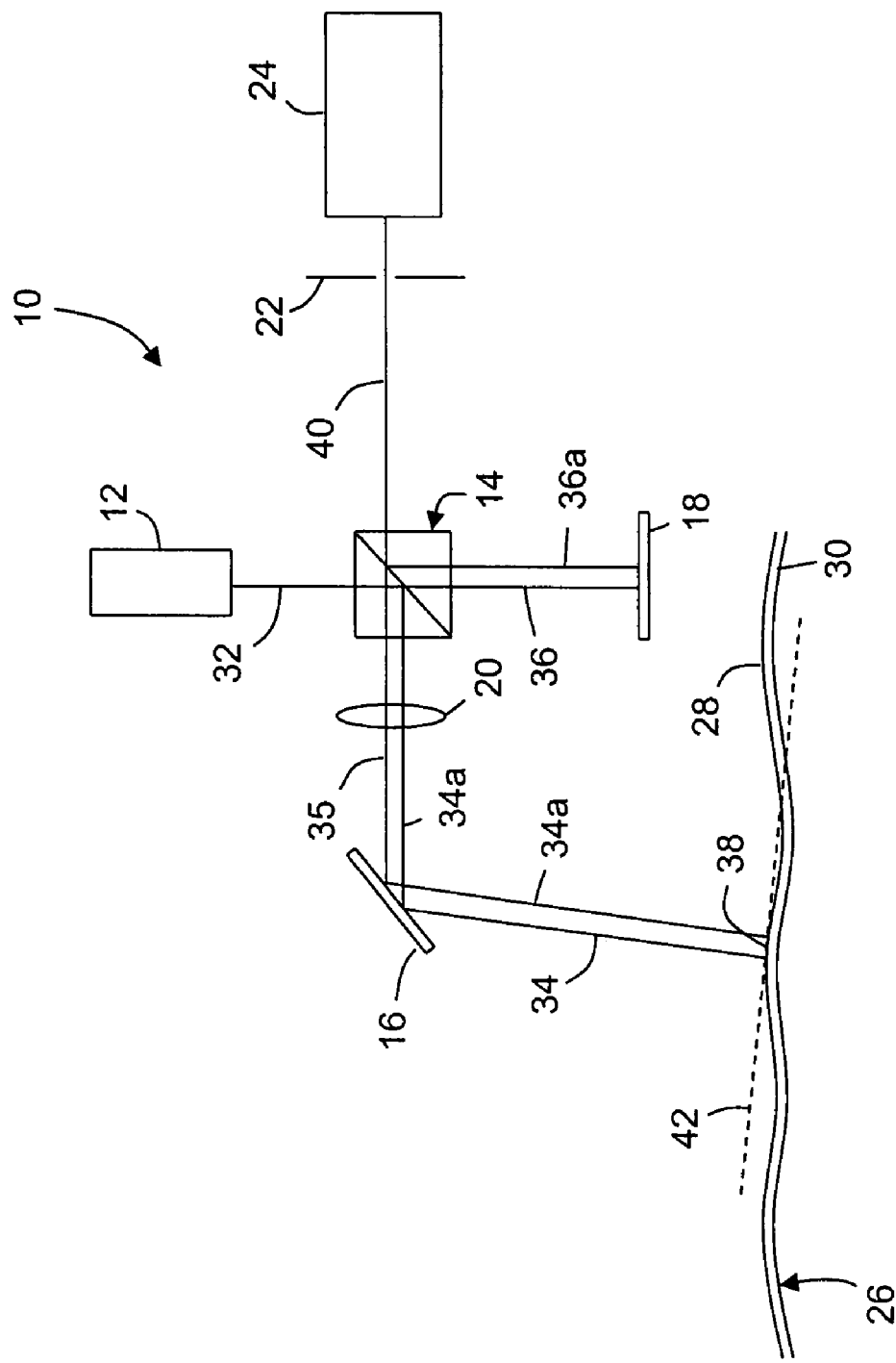
FIG. 1 is a schematic diagram of an embodiment of an optical system for characterizing a non-flat substrate.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

FIG. 1 is a schematic view of a measurement apparatus according to an embodiment of the present invention based on a Michelson interferometer. Measurement apparatus 10 comprises radiation source 12, polarizing beam splitter 14, first reflecting element 16, second reflecting element 18, collimating lens 20, aperture 22 and detection system 24.

Also shown in FIG. 1 is substrate 26. Substrate 26 is desirably flat, but due to the thinness and the large surface area of the substrate, substrate 26 tends to exhibit distortion or waviness, shown exaggerated in FIG. 1. Substrate 26 has a first side 28 and a second side 30 opposite to and substantially parallel with first side 28. Substrate 26 may have less than a square meter in surface area on one of first or second sides 28, 30, although typically substrate 26 has a surface area (as determined on a single side surface) greater than about 1 square meter, and in some cases in excess of 2 square meters, and in other instances in excess of 10 square meters.

In accordance with the present embodiment, a short coherence length beam 32 of radiation is emitted from radiation source 12 and is directed toward polarizing beam splitter 14. Preferably, the coherence length of the beam is less than the thickness of the substrate being measured. Preferably, the coherence length of the radiation beam is equal to or less than about 300 μm for substrates having a thickness equal to or less than 0.7 mm. By using a radiation source which produces a radiation beam with a very short coherence length, the apparatus can be used to effectively image a local surface portion of a first substrate surface without interference from reflections originating at the opposing second substrate surface. While any radiation source capable of producing a suitable coherence length may be used, a laser has been found to be well-suited to the present application.

Radiation beam 32 is split by polarizing beam splitter 14, with a first portion 34 of the beam being directed toward first, steering reflector 16 and a second portion 36 of the beam directed to second, reference reflector 18. The first portion 34 will hereinafter be referred to as measurement or probe beam 34, and the second portion will be referred to as reference beam 36. Steering reflector 16 is movable in two dimensions, being capable of both pitch and yaw movements, i.e. steering reflector 16 is rotatable about two orthogonal axes, and movement of steering reflector 16 is preferably computer controlled so that the position of steering reflector 16 may be automatically and precisely adjusted. For example, steering reflector 16 may be mounted on a gimbal (be gimbaled). Any suitable actuator may be used for producing motion of the reflector. For example, reflector 16 may be actuated by servo motors, stepper motors, galvometers or other actuating methods as are known in the art.

Alternatively, steering reflector 16 may comprise a plurality of reflectors. For example, a first steering reflector may be rotatable about a first axis while a second steering reflector (not shown) may be positioned so as to intercept probe beam 34 either before or after the first steering reflector. The second steering reflector is rotatable about a second axis orthogonal to the first axis. In either case, the steering reflector or reflectors are capable of directing probe beam 34 to a pre-determined location on glass sheet 26 allowable by the range of motion of the steering reflector(s) and within the field of view of the interferometer. Hereinafter, the present embodiment will be described in terms of a single, gimbal-mounted steering reflector, with the understanding that any similar reflecting device capable of redirecting probe beam 34 to glass sheet 26 may be used. An example of a suitable gimbal-mount for the reflector is a New Focus model number 8812 motorized gimbal mount. The reflecting surface itself should be capable of preserving the polarization integrity of the beams.

Following reflection from steering reflector 16, probe beam 34 irradiates a predetermined location, hereinafter referred to as local surface 38, located on first surface 28 of substrate 26, whereupon the probe beam is reflected back to reflecting element 16 and combined with reference beam 36 in beam splitter 14. Preferably, the local surface is a specular (mirror-like) surface. The probe beam reflected from local surface 38 is indicated by reference numeral 34a in FIG. 1.

Reference beam 36, produced at beam splitter 14, travels to reference reflector 18 and is reflected back to beam splitter 14 where it is collected and combined with probe beam 34. The reference beam reflected from reference reflector 18 is indicated by reference numeral 36a in FIG. 1. Combined beam 40 may then be imaged onto detection system 24 comprising a suitable sensor or other detector comprising an array of pixel elements (i.e. an m×n array of pixels). The array detector may contain, for example, in excess of 1 million pixels in order to receive, detect and spatially resolve the fringes in combined beam 40. A CCD sensor such as those used in digital cameras is a suitable detector for instance.

In one embodiment, detection system 24 may utilize a pixelated phase shifting or phase mask technique, such as that disclosed in U.S. Patent Publication 2005/0046865, the content of which is incorporated herein by reference in its entirety. As described in the aforementioned publication, a pixilated phase mask comprising sets of phase mask pixels is used to produce a pre-determined phase shift between portions of the polarized probe and reference beams. The resulting spatially separated intensity patterns of each set of phase mask pixels are directed onto a pixelated detector array. Advantageously, the pixelated phase mask technique facilitates virtually instantaneous real-time characterization of local surface 38.

In the case where local surface 38 is flat and perpendicular to the incident probe beam 34, and there are no defects on local surface 38, the combined probe and reference beams are designed to have substantially equal optical path lengths within the tolerance range of the coherence length, and therefore produce high contrast interference fringes when combined. That is, the optical path length traversed by probe beam 34 should be within a coherence length of the optical path length traversed by the reference beam 36. Consequently the combined beam produces broad fringes which result in a substantially constant intensity over a cross sectional area of the beam in a plane perpendicular to the longitudinal axis of the beam. That is, a single particular fringe may cover a substantial portion of the field of view of the interferometer. On the other hand, if the substrate is tilted relative to the incident probe beam, i.e. not perpendicular to the longitudinal axis of the incident probe beam, an interference pattern will be formed consisting of alternating light and dark fringes.

If a defect exists on local surface 38, the change in optical path length at the defect will incur an optical path length difference in that portion of the beam incident on the defect. The resultant optical path length difference will produce a localized interference fringe pattern in the combined beam and subsequent interference fringes, or alternating light and dark regions that encircle the defect in the image of the local surface. The size (e.g. height) of the defect may be determined from the attributes of the interference fringes, such as by the size and spacing of the fringes. The method of making this determination is well-known in the art, and will not be described further so as not to obscure the present invention.

In some cases, the local surface may not be perpendicular to the longitudinal axis of the incident probe beam. This may occur because the substrate under measurement exhibits surface unevenness, or waviness, due to the large size and extreme thinness of the substrate, and an imperfect mechanism for fixturing the substrate in a production environment. This becomes particularly troublesome when the defects to be measured are extraordinarily small, being on the order of nanometers in height, and the defect or defects must be measured quickly so as not to slow the production process. Waviness or other unevenness in the sheet surface may result in local surface 38 having an orientation other than perpendicular to the probe beam axis—the substrate may be locally tilted. Tilt of the local surface results in a differential path length across the image reflected from the local surface. Tilt of the local surface 38 is indicated by dashed line 42 in FIG. 1. When the probe beam reflected from the local surface is combined with the reference beam reflected from the reference reflector, these path length differences result in tilt-related interference fringes. The tilt-related interference fringes may make it difficult or impossible to discern the defect-related fringes (fringe confusion), e.g. by limiting the dynamic range of the fringes. It is desirable therefore to have the ability to null out, or minimize the number of tilt-related fringes in order to measure the defect related fringes. One method of nulling out the tilt-related fringes is by bringing the probe beam incident on the specular local surface into alignment with the local surface. That is, direct the incident probe beam such that the longitudinal axis of the probe beam is substantially perpendicular to the local surface. The degree of perpendicularity required is dependent upon the design of the interferometer, such as, for example, the field of view of the interferometer. For example, in some embodiments, perpendicularity within about 0.5 degrees of perpendicular may be applied.

Alignment of the probe beam with the local surface may be accomplished, for example, by moving measurement apparatus 10 relative to the substrate. However, the measurement apparatus is typically large, and heavy. It is not desirable in a production environment to be undertaking continuous movement of the entire measurement apparatus, as the mass of the instrument slows the response time for movements, and hence increases measurement time. Moreover, the mounting apparatus necessary to provide the requisite motion to the measurement apparatus can be more costly than the measurement apparatus itself and require considerable physical space to implement.

Alternatively, one may also move the substrate being measured relative to the measurement apparatus. However, this too presents problems due to the size and relative flexibility of the substrate: movement of the substrate in order to align the substrate with the probe beam may only further exacerbate the already highlighted issues, including flexing of the substrate which may induce greater unevenness of the substrate surface.

According to a method of the present invention, the probe beam is actively aimed or steered using reflective element 16. Reflective element 16 is rotated as appropriate to ensure that probe beam 34 is incident on local surface 38 such that the tilt-related interference fringes are minimized or eliminated. This condition is generally met when the longitudinal axis of the incident probe beam is substantially perpendicular with the local surface and the local surface is generally flat. Although movement of reflective element 16 may result in a change in the path length of probe beam 34, as long as the movement results in a path length difference less than the coherence length of beam 32, the path length differential is acceptable.

In another embodiment of the present invention, both the interferometer and the reflecting element are mounted on a movable stage such that the reflecting element and the interferometer are translatable such that the optical path length of the probe beam may be varied. Thus, the second surface of the substrate may be imaged, with the first surface separated from the substrate first surface by more than a coherence length of beam 32. In a manner similar to that described supra, the topography of a local surface on the substrate second surface may be imaged without interference from the first surface, and without substantial movement of the substrate or measurement apparatus 10. Accordingly, by moving measurement apparatus 10 nominally perpendicular to first surface 28 in FIG. 1, second surface 30 may be brought into "focus", while first surface 28, outside the coherence length of the beam, is not observed. A similar effect may be accomplished by movement of second reflector 18, without the need to move the entire apparatus. That is, second reflector 18 may be translated along the longitudinal axis of reference beam 36, while maintaining the longitudinal axis of the reference beam perpendicular to the reflecting surface of reflector 18. In so doing the field of focus of the probe beam may be varied (the field of focus in this instance being defined as meeting the condition that the optical path lengths of the probe and reference beams are equal, within the coherence length of the beams).

Figure 2:
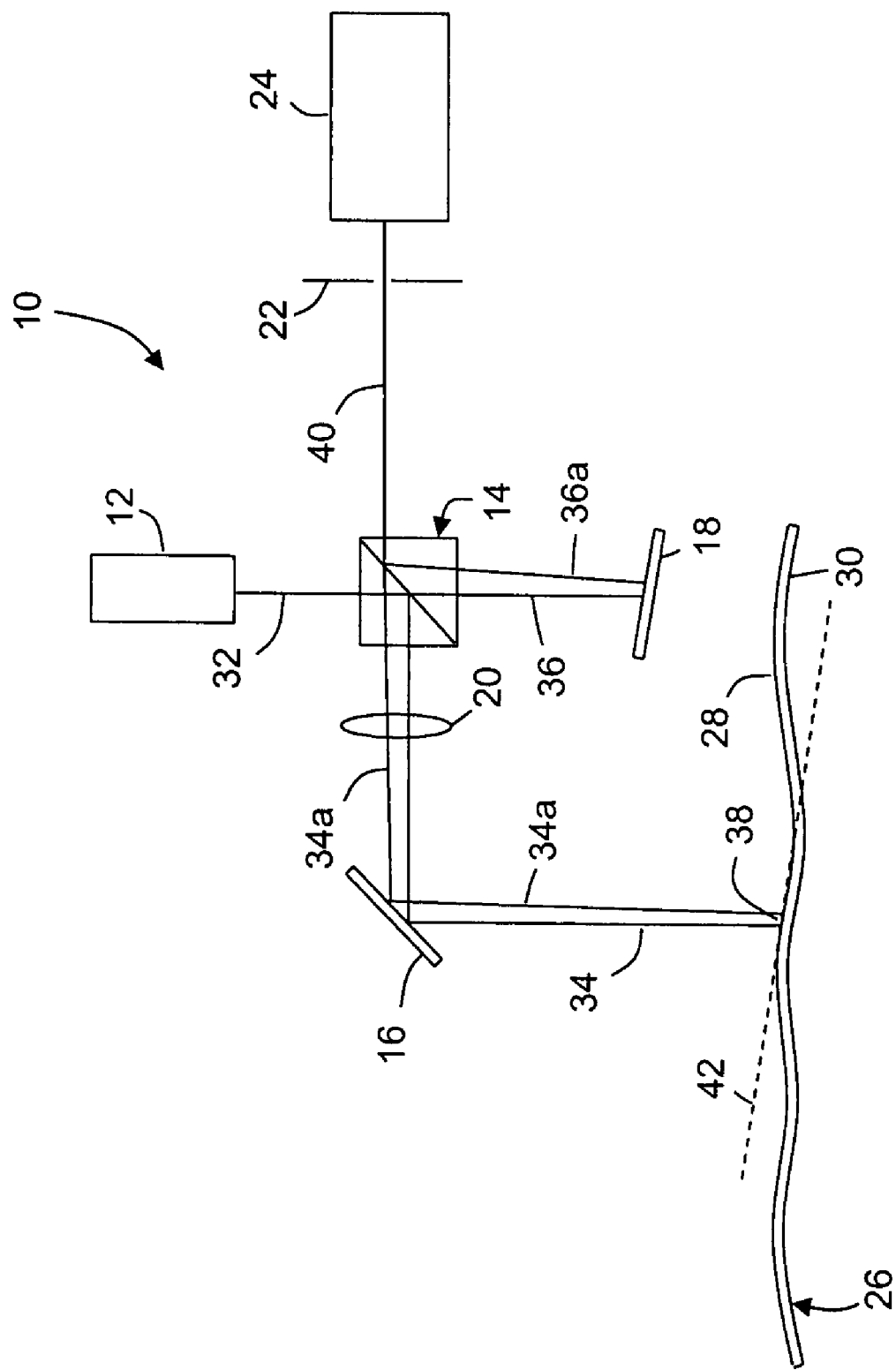
FIG. 2 is a schematic diagram of another embodiment of an optical system for characterizing a non-flat substrate.

In still another embodiment, the probe beam may be held stationary, but wherein the reference beam is intercepted by a reflecting element which is rotatable about at least two orthogonal axes. The basic operation of the reflecting element is similar to the operation of the preceding embodiment. Illustrated in FIG. 2 is an alternative embodiment of measurement apparatus 10. In the apparatus of FIG. 2, first reflecting element 16 is used to fold probe beam 34 in a predetermined direction such that probe beam 34 is incident on first surface 28 of substrate 26. If the measurement apparatus is oriented such that probe beam 34 is incident on substrate 26 without the need for first reflecting element 16, first reflecting element 16 may be eliminated.

As shown in FIG. 2, probe beam 34 may be incident on substrate first surface 28 at an angle such that the longitudinal axis of probe beam 34 is not substantially perpendicular to local surface 38. As a result, the tilt exhibited by the substrate imparts an angle to the reflected probe beam such that the probe beam return (reflected) path 34a exhibits an angular deflection from the incident path 34. To compensate, second reflector 18 is mounted on a motorized gimbal (or other suitable steerable mount) in a manner similar to the method in which first reflector 16 was mounted in the previous embodiment. Second gimbaled reflective element 18 is rotated about one or both of two orthogonal axes to null the substrate tilt related interference fringes, allowing clear detection of the defect-related fringes. That is, movement of second reflective element 18 causes the reference beam to be reflected along a path 36a which is not coincident with the incident path 36, but which combines with the probe beam reflected along path 34a to null the tilt.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of characterizing a topography of a substrate comprising;

providing a radiation beam comprising a coherence length less than about 300 µm;

splitting the radiation beam into a probe beam and a reference beam;

intercepting the probe beam with a first reflective element;

steering the probe beam with the first reflective element to perpendicularly irradiate a specular local surface of a non-flat substrate, and wherein the probe beam is reflected from the local surface;

intercepting and reflecting with the first reflector the probe beam reflected from the local surface;

intercepting and reflecting the reference beam with a second reflective element such that optical path lengths of the probe beam and the reference beam are substantially equal;

collecting the probe beam reflected from the first reflective element and the reference beam reflected from the second reflective element;

combining the reflected reference beam and the probe beam reflected from the first reflective element to produce an interference pattern;

detecting the interference pattern across a two-dimensional array of pixels; and using a phase shifting interferometer to determine a topography of the local surface.

2. The method according to claim 1 wherein the first reflective element is steered by a galvometer.

3. The method according to claim 1 wherein the first reflective element comprises a plurality of individually steerable mirrors.

4. The method according to claim 1 wherein the first reflective element is gimbaled.

5. The method according to claim 1 wherein the non-flat substrate comprises a first side and a second side, the first side being nearest the interferometer, and wherein the local surface is on the first side.

6. The method according to claim 1 wherein the non-flat substrate comprises a first side and a second side, the first side being nearest the interferometer, and wherein the local surface is on the second side.

7. The method according to claim 1 wherein the substrate comprises glass.

8. The method according to claim 1 wherein a thickness of the substrate is equal to or less than about 0.7 mm.

9. The method according to claim 1 further comprising translating the second reflective element parallel to a longitudinal axis of the reference beam.

* * * * *